United States Patent
Eom

(10) Patent No.: US 11,341,095 B2
(45) Date of Patent: May 24, 2022

(54) ELECTRONIC DEVICE FOR SEARCHING FOR FILE INFORMATION STORED IN EXTERNAL DEVICE AND OPERATION METHOD THEREOF

(71) Applicant: Samsung Electronics Co., Ltd., Gyeonggi-do (KR)

(72) Inventor: Mira Eom, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 131 days.

(21) Appl. No.: 16/824,832

(22) Filed: Mar. 20, 2020

(65) Prior Publication Data

US 2020/0301884 A1 Sep. 24, 2020

(30) Foreign Application Priority Data

Mar. 20, 2019 (KR) .................... 10-2019-0031762

(51) Int. Cl.
*G06F 16/16* (2019.01)
*G06F 16/178* (2019.01)
*G06F 16/13* (2019.01)

(52) U.S. Cl.
CPC ............ *G06F 16/168* (2019.01); *G06F 16/13* (2019.01); *G06F 16/178* (2019.01)

(58) Field of Classification Search
CPC .......... G06F 21/53; G06F 2009/45587; G06F 21/78; G06F 2221/2153; G06F 9/5077; G06F 2221/034; G06F 11/1458; G06F 21/62
See application file for complete search history.

(56) References Cited

U.S. PATENT DOCUMENTS

| 7,809,756 | B2  | 10/2010 | Barney et al. |
| 9,384,098 | B1  | 7/2016  | Smith |
| 2006/0085474 | A1  | 4/2006 | Tsubono |
| 2007/0146790 | A1  | 6/2007 | Park |
| 2011/0028096 | A1* | 2/2011 | Tokunaga .......... H04N 5/23206 455/41.2 |
| 2014/0118619 | A1* | 5/2014 | Hagiwara .............. H04N 21/47 348/554 |

(Continued)

FOREIGN PATENT DOCUMENTS

| KR | 10-2011-0081606 A | 7/2011 |
| KR | 10-2018-0017148 A | 2/2018 |
| KR | 10-2018-0113720 A | 10/2018 |

OTHER PUBLICATIONS

International Search Report dated Jun. 26, 2020.

*Primary Examiner* — Angelica Ruiz
(74) *Attorney, Agent, or Firm* — Cha & Reiter, LLC.

(57) ABSTRACT

An electronic device according to an embodiment disclosed herein may include a display, an input device, a connecting terminal, a storage, and a processor. The processor may be configured to: copy information about files and folders stored in an external device; generate a list of the files and the folders stored in the external device; receive a first user input for selecting one or more of the files or folders included in the list of the files and the folders; copy the selected file or folder from the external device and store the copied file or folder in the storage; and maintain the display of the list of the files and the folders even after the external device is disconnected. Various other embodiments are possible.

20 Claims, 9 Drawing Sheets

(56) References Cited

U.S. PATENT DOCUMENTS

| | | | |
|---|---|---|---|
| 2015/0082457 A1* | 3/2015 | Nakamura | G06F 21/6236 |
| | | | 726/27 |
| 2015/0089181 A1 | 3/2015 | Tsao | |
| 2016/0065887 A1* | 3/2016 | Ishizu | H04N 5/23206 |
| | | | 348/231.6 |
| 2018/0121351 A1 | 5/2018 | Zhang et al. | |
| 2019/0018974 A1* | 1/2019 | Chae | H04W 76/10 |

\* cited by examiner

ELECTRONIC DEVICE FOR SEARCHING FOR FILE INFORMATION STORED IN EXTERNAL DEVICE AND OPERATION METHOD THEREOF

CROSS-REFERENCE TO RELATED APPLICATION(S)

This application is based on and claims priority under 35 U.S.C. 119 to Korean Patent Application No. 10-2019-0031762, filed on Mar. 20, 2019, in the Korean Intellectual Property Office, the disclosure of which is herein incorporated by reference in its entirety.

BACKGROUND

1) Field

One or more embodiments disclosed herein generally relate to an electronic device that can search for file information stored in an external device and an operation method of the electronic device. More specifically, the electronic device is capable of identifying file information by searching for files and folders stored in a currently connected external device and an external device that is not currently connected.

2) Description of Related Art

Since built-in storage of electronic devices, in particular mobile devices, is limited in capacity, various external storage devices may be used. These external storage devices may be connected to the electronic device through various input/output interfaces. Conventionally, in order to identify information stored in an external storage device and execute programs or open files stored in the external storage device, the external storage device needs to be connected through an input/output interface of the electronic device.

The above information is presented as background information only to assist with an understanding of the disclosure. No determination has been made, and no assertion is made, as to whether any of the above might be applicable as prior art with regard to the disclosure.

SUMMARY

In order for an electronic device to identify information stored in a specific external device among a plurality of external devices, the specific external device and the electronic device needs to remain connected.

When the external device and the electronic device are disconnected, the electronic device may still access the files of the external device if all files and folders of the external device are copied and stored in the electronic device. However, this creates a burden on the storage capacity of the electronic device.

In order to use a file stored in a specific external device among a plurality of external devices, there may be a need to separately store the file to be used.

An electronic device according to an embodiment disclosed herein may include a display; an input device; a connecting terminal; a storage; and a processor operatively connected to the display, the input device, the connecting terminal, and the storage. According to an embodiment, the processor may be configured to: copy information about files and folders stored in an external device when the external device is connected to the electronic device; generate a list of the files and the folders stored in the external device, based on the copied information, and display the generated list of the files and the folders through the display; receive a first user input for selecting some of the files or folders included in the list of the files and the folders; in response to the reception of the first user input, copy the selected file or folder from the external device and store the copied file and folder in the storage; maintain displaying of the list of the files and the folders even if the external device is disconnected, and execute the file or the folder stored in the storage in response to a second user input for executing the file or the folder stored in the storage.

An operation method of an electronic device according to an embodiment disclosed herein may include: copying information about files and folders stored in an external device when the external device is connected to the electronic device; generating a list of the files and the folders stored in the external device, based on the copied information, and displaying the generated list of the files and the folders through a display; receiving a first user input for selecting some of the files or folders included in the list of the files and the folders; in response to reception of the first user input, copying the selected file or folder from the external device and storing the copied file and folder in a storage; maintaining the display of the list of the files and then folders even after the external device is disconnected, and executing the file or folder stored in the storage in response to a second user input for executing the file or the folder stored in the storage.

Additional aspects will be set forth in part in the description which follows and, in part, will be apparent from the description, or may be learned by practice of the presented embodiments.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
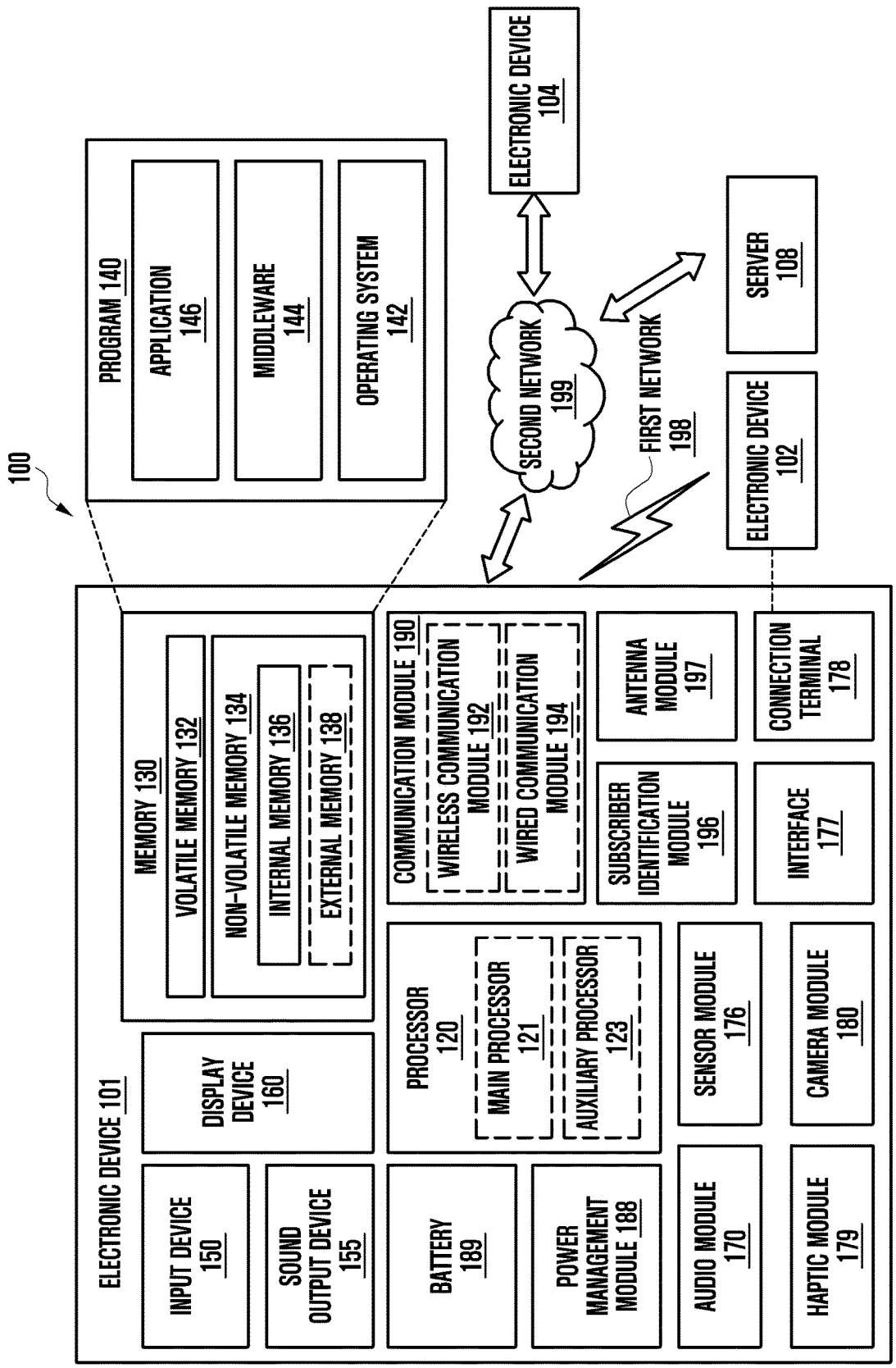
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
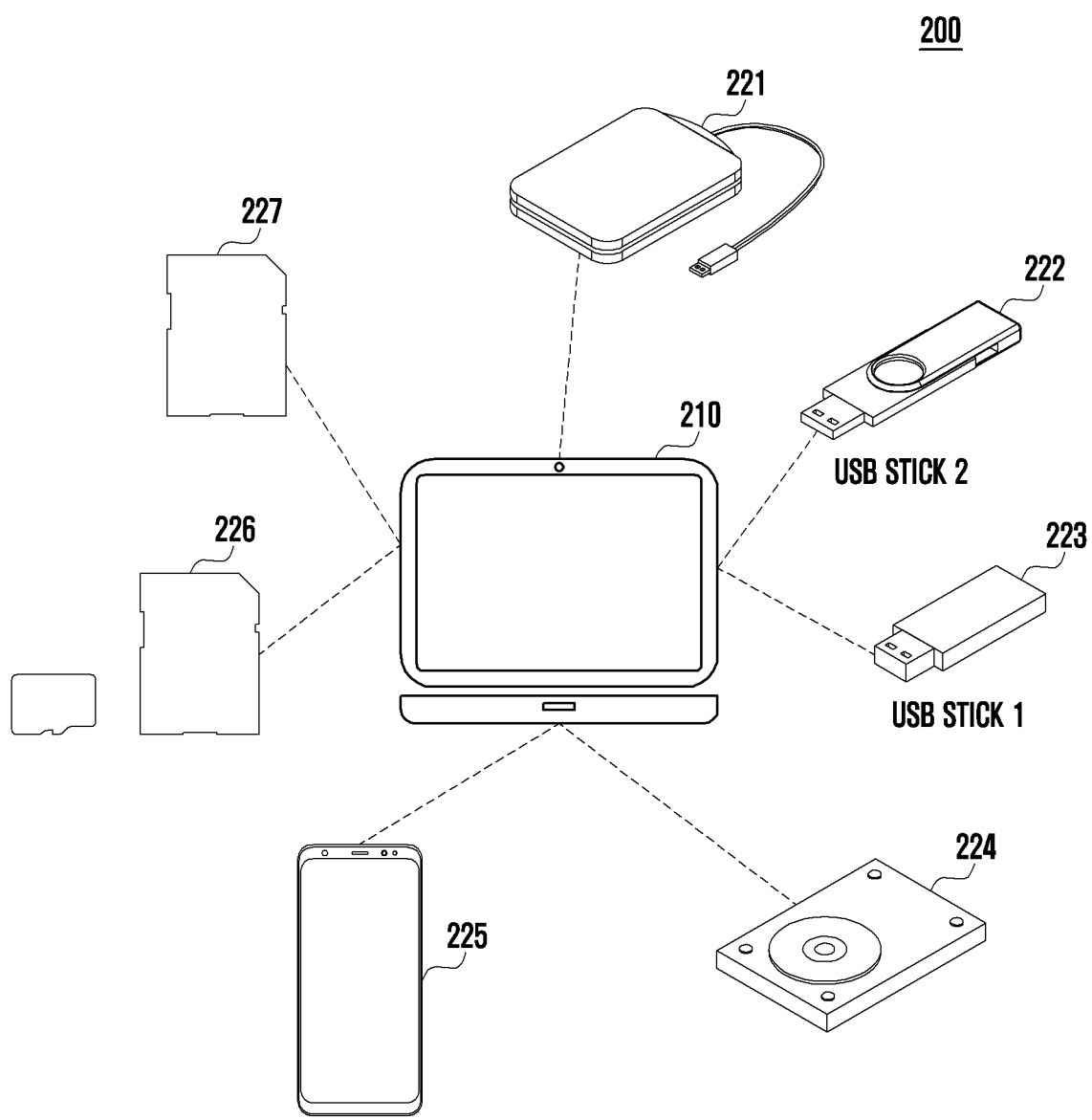
FIG. 2 is a diagram illustrating various external devices that are connected to an electronic device according to an embodiment.

FIG. 2 is a diagram illustrating various external devices that are connected to an electronic device according to an embodiment.

Referring to FIG. 2, an electronic device 210 (e.g., the electronic device 101 of FIG. 1) according to an embodiment disclosed herein may be connected to various external devices. The external device may include, for example, external storage device or a portable terminal 225 including an internal storage. The external storage device may include, for example, an external hard drive 221, USB drives 222 and 223, a hard disk 224, a micro SD card 226, or an SD card 227.

According to an embodiment, the electronic device 210 may be connected to various external devices through a connecting terminal. The electronic device 210 may identify and use files and folders, for example, stored in an external device when the external device is connected.

According to an embodiment, if an external device is connected, the electronic device 210 may copy information about the files and folders stored in the external device. For example, the electronic device 210 may generate a list of files and folders based on the copied information about the files and folders and store the list of files and folders in the electronic device 210. According to an embodiment, even if the external device is subsequently disconnected, the electronic device 210 may identify information about the files and folders stored in the external device by using the generated list of files and folders. According to an embodiment, if a plurality of external devices are connected, the electronic device 210 may generate a plurality of lists of files and folders each corresponding to each of the plurality of external devices, respectively. Then, even if the plurality of external devices are subsequently disconnected from the electronic device 210, the electronic device 210 may identify information about the files and folders stored in the plurality of external devices by using the generated plurality lists of files and folders corresponding to the plurality of external devices.

According to an embodiment, the electronic device 210 may identify information about files and folders through a generated list of files and folders. The information about files and folders may include, for example, file names, folder names, tree structures of folders, storage locations, generation times, recent modification times, recent access times, various file attributes, file sizes and/or information on clusters.

According to an embodiment, the list of files and folders corresponding to an external device may be the same as the structure of files and folders stored in the external device.

According to an embodiment, if an external device is connected, the electronic device 210 may select some files or folders from a generated list of files and folders and store the selected files or folders. For example, if the electronic device 210 receives a user input for selecting some files or folders included in the list of files and folders, the electronic device 210 may copy the some files or folders, selected from a list of files and folders, from a connected external device and store the copied some files or folders in the electronic device 210. Then, even after the external device is subsequently disconnected, the stored some files or folders may be still be accessed by the electronic device 210.

Figure 3:
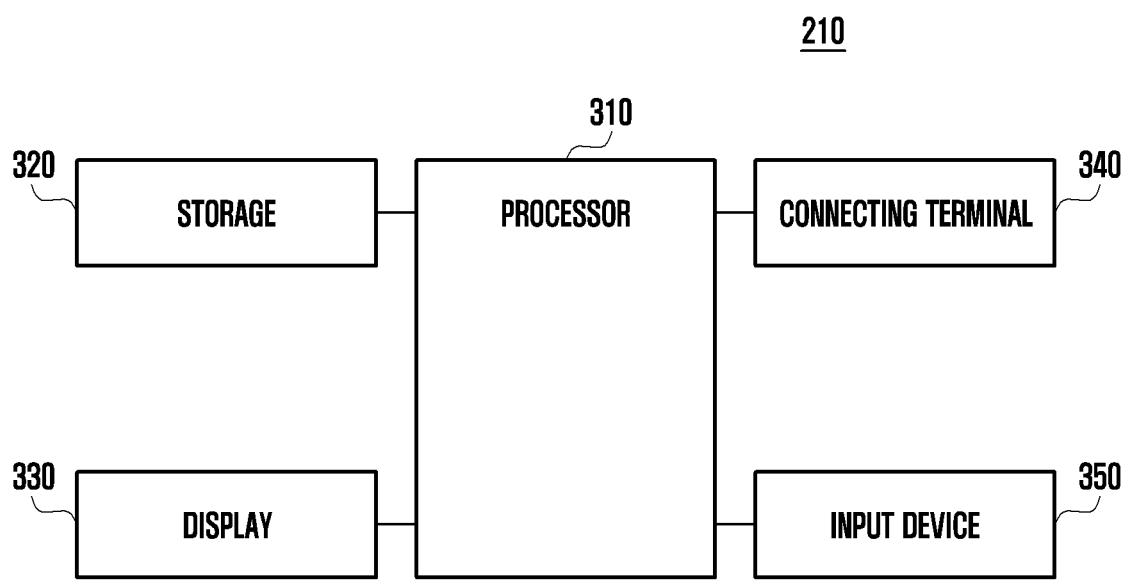
FIG. 3 is a block diagram of an electronic device according to an embodiment.

FIG. 3 is a block diagram of an electronic device according to an embodiment.

Referring to FIG. 3, an electronic device 210 according to an embodiment may include a processor 310 (e.g., the processor 120 of FIG. 1), a storage 320 (e.g., the memory 130 of FIG. 1), a display 330 (e.g., the display device 160 of FIG. 1), a connecting terminal 340 (e.g., the connecting terminal 178 of FIG. 1), and/or an input device 350 (e.g., the input device 150 of FIG. 1). Without departing from the spirit of the embodiments disclosed herein, one or more components shown in FIG. 3 may be omitted, or additional components that are not shown may be added. The processor 310 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the processor 310 may be an element capable of performing calculation related to control and/or communication of respective elements of the electronic device 210, or data processing thereof, and may include at least some of the configurations and/or functions of the processor 120 of FIG. 1. For example, the processor 310 may be electrically and operatively connected to the storage 320, the display 330, the connecting terminal 340, and the input device 350, which are internal elements of the electronic device 210.

According to an embodiment, the storage 320 may store a list of a plurality of files and folders corresponding to a plurality of external devices, respectively. The list of files and folders may include, for example, information about files and folders included in the corresponding external device. According to an embodiment, the processor 310 may copy some files or folders, selected from a list of files and folders, from a connected external device and store the copied files or folders in the storage 320 of the electronic device.

According to an embodiment, the display 330 may display various screens under the control of the processor 310.

According to an embodiment, the connecting terminal 340 may include a connector through which the electronic device 210 may be physically or electrically connected to an external device. The connecting terminal 340 may include, for example, an HDMI connector, a USB connector, an SD card connector, or an audio connector (e.g., a headphone connector). More specifically, the connecting terminal 340 may physically connect the electronic device 210 and an external device so as to establish a communication link between the electronic device 210 and the external device.

According to an embodiment, the input device 350 may receive a user input or data to be used by the processor 310. The input device 350 may include, for example, a mouse or a keyboard.

According to an embodiment, the processor 310 may recognize that an external device is connected through the connecting terminal 340. The processor 310 may, for example, identify the connected external device. In this example, the processor 310 may identify a file system of the connected external device. The file system may refer to, for example, a system that manages the files that are stored in the external device. Examples of file systems include File Allocation Table 16 (FAT16), File Allocation Table 32 (FAT32), New Technology File System (NTFS), Second Extended File System (ext2), and ReiserFS.

According to an embodiment, the processor 310 may copy information about the files and folders stored in the connected external device. The information about the files and folders may include, for example, file names, folder names, tree structures of folders, storage locations, generation times, recent modification times, recent access times, various file attributes, file sizes and/or information on clusters. According to an embodiment, the processor 310 may copy information about the files and folders stored in the external device, based on the file system of the external device. For example, if a plurality of areas implementing the file system of the external device in a storage of the external device includes an area containing information about a file list, the processor 310 according to an embodiment may copy the entire area (block copy) that contains the information about the file list. The information about the file list may contain, for example, information about the files and folders stored in the external device. For example, if the file system of the external device is NTFS, the processor may entirely copy (block copy) the master file table (MFT) area in the storage of the external device. The details of NTFS structure will be described in detail with reference to FIGS. 9 and 10.

According to an embodiment, for example, if the plurality of areas implementing the file system of the external device does not include an area containing information about the file list, the processor 310 may copy information about the files and folders of the external device by repeating file input/output calls (for example, file I/O API calls) for each file stored in the external device.

According to an embodiment, the processor 310 may generate a list of files and folders based on the copied information about the files and folders. For example, if the area including information about the file list is entirely copied, the processor 310 may generate a list of files and folders based on the information about the file list included in the copied area. In another example, the processor 310 may generate a list of files and folders based on the copied information about files and folders copied by repeating file input/output calls for each file stored in the external device.

According to an embodiment, the processor 310 may display the generated list of files and folders through the display 330. The processor 310 may store, for example, the generated list of files and folders in the storage 320.

According to an embodiment, the processor 310 may receive a user input for selecting some of the files or folders included in the list. For example, the processor 310 may receive a user input for selecting some of the files or folders included in the list through the input device 350 (e.g., mouse or keyboard). The processor 310 according to an embodiment may copy the selected files or folders from the external device in response to reception of the user input, and may store the selected file or folder in the storage 320.

According to an embodiment, the processor 310 may control the display 330 to maintain displaying of the list even after the external device is disconnected. For example, the processor 310 may control the display 330 to display the list so as to allow the user to search for and identify information about the files or folders included in the list even after the external device is disconnected.

According to an embodiment, the processor 310 may execute or otherwise use or manipulate the files or folders stored in the storage 320 even after the external device is disconnected. The processor 310 may execute files or folders stored in the storage 320, for example, upon receiving a user input for executing files or folders stored in the storage 320 even after the external device is disconnected.

According to an embodiment, if an external device is connected, the processor 310 may determine whether the external device is connected to the electronic device 210 for the first time. For example, if there is no corresponding list of files and folders for the external device in the storage 320, the processor may determine that the external device is connected for the first time. Alternatively, and if there is a list of files and folders corresponding to the external device in the storage 320, the processor may determine that the external device has been previously connected.

According to an embodiment, if an external device is disconnected and then reconnected, the processor 310 may compare the files or folders stored in the storage 320 with the files or folders currently stored in the external device to determine whether the files or folders stored in the storage 320 are the same as those stored in the external device. For example, the processor may compare the latest modification times of the files or folders stored in the storage with those of the files or folders currently stored in the external device to determine which files have been modified. Thus, the processor 310 may determine information about the latest state of the files or folders stored in the storage 320, for example, based on the result of the determination.

According to an embodiment, if an external device is disconnected and then reconnected, the processor 310 may synchronize the files or folders stored in the storage 320, based on information on the latest state of the files or folders stored in the storage 320 determined from the files and folders stored in the external device and a preconfigured synchronization method.

According to an embodiment, if an external device is disconnected and then reconnected, the processor 310 may change the list of files and folders stored in the electronic device 210, based on information about file changes included in the file system of the external device. For example, if the file system is NTFS, the file system (or a processor of the external device) may record, in an update sequence number (USN) journal, all the changes to the volume since the last backup was made. The USN journal may be, for example, a block included in NTFS. The processor 310 may fetch information about the files and folders stored in the external device, changed after the last saved time point (e.g. the last time the external device was connected to the electronic device 210) by using information recorded in the USN journal, and may update the list of files and folders to the latest state by using the fetched information. If using the USN journal, processing speed can be improved since information about all file changes needs not to be identified.

Figure 4:
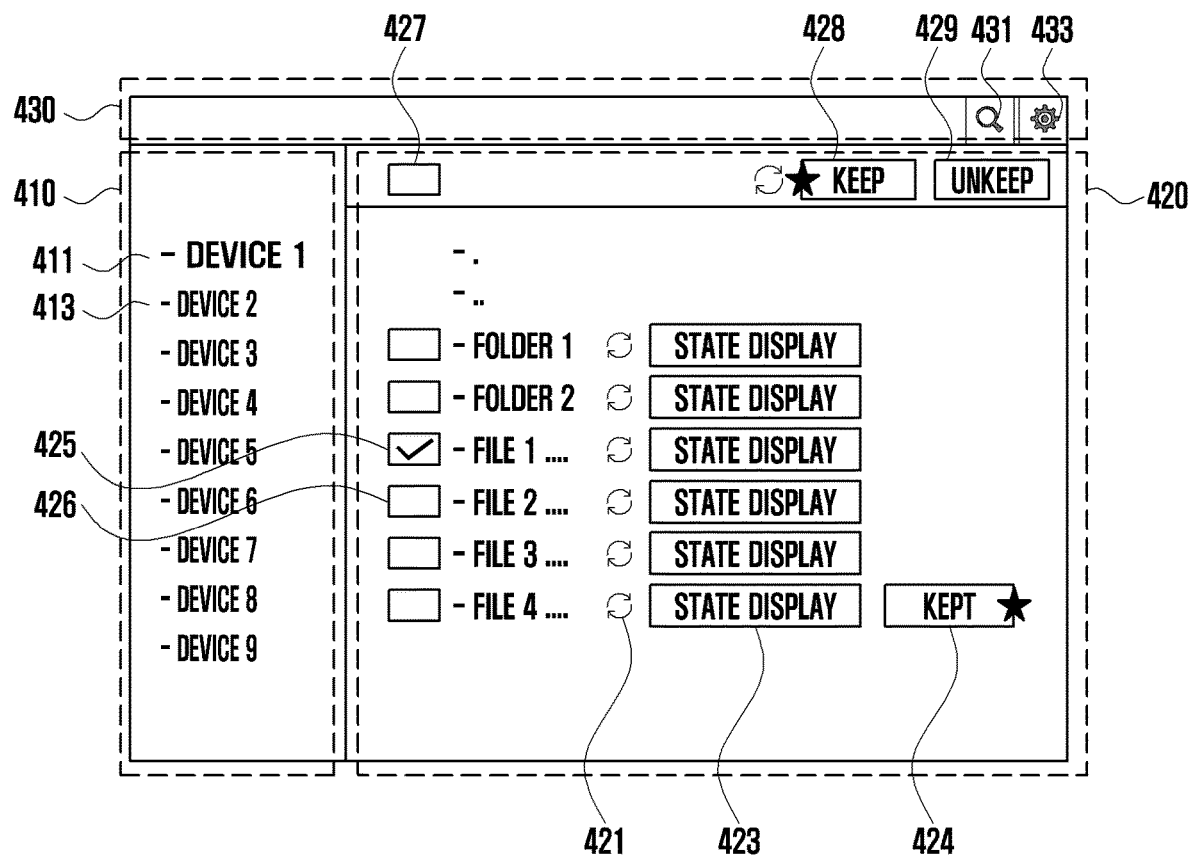
FIG. 4 is a view illustrating a screen displayed on an electronic device according to an embodiment.

FIG. 4 is a view illustrating a screen displayed on an electronic device according to an embodiment.

Referring to FIG. 4, the processor 310 according to an embodiment may display a screen 400 for searching for files or folders included in at least one external device through the display 330. According to an embodiment, the screen 400 may include an external device list area 410, a file-and-folder list area 420, and a search area 430.

According to an embodiment, the external device list area 410 may be an area in which, for example, a list of a plurality of external devices which are currently connected to the electronic device 210 or which have been connected to the electronic device 210 at least once in the past is displayed. For example, in the external device list area 410, the processor 310 may distinguish between currently connected external devices and external devices which are not currently connected. More specifically in this example, referring to the area 410, the processor 310 may display currently connected external device 1 411 in bold and large letters, and may display external device 2 413 to external device 9, which are not currently connected, in thin and small letters. According to another embodiment, the processor 310 may display a currently connected external device and an external device which is not currently connected in different colors. If the processor 310 receives, for example, a user input (for example, a click) of selecting one external device from the external device list, the processor 310 displays, in the file-and-list area 420, the list of files and folders corresponding to the selected external device.

According to an embodiment, the processor 310 may display a list of files and folders corresponding to a selected external device regardless of whether the external device is currently connected or not.

According to an embodiment, the file-and-folder list area 420 may display, for example, a list of files and folders corresponding to an external device selected in the external device list. The displayed list of files and folders may be, for example, a list of files and folders generated by copying information about the files and folders stored in the selected external device. The processor 310 according to an embodiment may provide information about the files and folders included in a list of files and folders. The information about the files and folders includes, for example, file names, folder names, tree structures of folders, storage locations, generation times, recent modification times, recent access times, various file attributes, file sizes and/or information on clusters.

According to an embodiment, the processor 310 may provide check user interfaces (UIs) 425 and 426 allowing selection of each of the files and folders included in the list of files and folders, and a global check UI 427 allowing selection of all of the files and folders included in the list. According to an embodiment, the processor 310 may provide, in the file-and-folder list area 420, a synchronization UI 421 allowing the user to manual synchronize a particular file or folder included in the list of files and folders, a state display UI 423 capable of determining and displaying the latest state of the files and folders included in the list, and a UI 424 capable of identifying whether a particular file or folder is stored. According to an embodiment, the UI 424 may be displayed only for files and folders currently stored in the storage 320 of the electronic device 210. For example, referring to FIG. 4, in the list of files and folders of external device 1 411, it is shown that only file 4 is stored in the storage 320. In this case, only UI 424 corresponding to file 4 is displayed in as "kept." Alternatively, in the case of file 3, which is not stored in the storage 320, the UI identifying if file 3 is stored is not be displayed.

The processor 310 according to an embodiment may provide a storage UI 428 for storing a file or a folder selected in the list of files and folders, and a delete UI 429 for deleting a stored file or folder.

The search area 430 according to an embodiment may be, for example, an area in which a search function 431 is performed to enable the user to search for a desired file or folder. The processor 310 may provide the search function 431 of a file or folder regardless of whether the plurality of external devices are currently connected or not. For example, the user may search for, through the search function 431, information about a file stored in a specific external device that is not currently connected to the electronic device 210. In this case, the user may identify in which external device the desired file is stored.

The processor 310 according to an embodiment may display, in the search area 430, a configuration UI 433 for configuring the synchronization method used to synchronize the information stored in the electronic device 201 and the information stored in the plurality of external devices. For example, the user may configure a synchronization method for the stored files and folders through the configuration UI 433. The synchronization method for the stored files and folders may include, for example, a method for performing synchronization using the latest files stored in an external device and the files stored in the electronic device 210, a method for performing synchronization using files stored in an external device, a method for performing synchronization using files stored in the electronic device 210, or a method for performing synchronization manually.

According to an embodiment, upon receiving a user input for selecting the storage UI 428, the processor 310 may store, in the storage 320, files or folders for which the check UIs 425 and 426 are selected in the list. For example, as shown in the example of FIG. 4, external device 1 411 is connected to the electronic device 210. In this example, if file 1 425 has been selected from the list of files and folders and a user input for selecting the storage UI 428 is received, the processor 310 may copy file 1 425 from external device 1 411 and store copied file 1 in the storage 320. In this case, the user may execute or use file 1 425 stored in the storage 320 in the electronic device 210 even if the external device 1 411 is disconnected. When the file 1 425 is an image or video, the processor 310 may further generate a thumbnail for the image or video and store the thumbnail. In the case of file 2 426 for which a check UI is not selected, when the processor receives the user input for selecting the storage UI 428, file 2 426 may not be stored in the storage 320 because the check UI is not selected. This way, when the external device 1 411 is disconnected, the user may only view file information (e.g., file storage location and file name) of the file 2 426, and would not be able to access file 2 426 itself.

According to an embodiment, upon receiving a user input for selecting the state display UI 423, the processor 310 may compare files stored in the storage 320 with the corresponding files stored in the external device, so as to determine the latest state. For example, assume that the processor 310 has copied file 1 425 from the external device 1 411 and stored the file in the storage 320. The external device 1 411 is then disconnected, and file 1 425 stored in the storage 320 is subsequently used and modified. In this case, if the external device 1 411 is reconnected to the electronic device 210, file 1 stored in the external device 1 411 and file 1 stored in the electronic device 210 may include different content. The processor 310 may compare information (for example, the latest modification time) of file 1 stored in the external device with information (the latest modification time) of file 1 stored in the electronic device 210, so as to determine the latest state. In the above example, the processor 310 may determine that file 1 stored in the electronic device 210 is the latest file. According to an embodiment, the processor 310 may compare files stored in the external device with files stored in the electronic device 210 to determine whether files stored in the electronic device 210 are the latest or whether the files stored in the external device are the latest. The processor 310 may also determine whether the files stored in the external device are deleted or are the same as the files stored in the electronic device.

According to an embodiment, if the external device is reconnected to the electronic device 210, the processor 310 may perform automatic synchronization using a preconfigured method in response to detection of the reconnection, or may perform manual synchronization by receiving a user input for selecting the synchronization UI 421. According to an embodiment, manual synchronization may be performed individually for each file and folder included in the list of files and folders. According to an embodiment, upon receiving a user input for selecting the synchronization UI 421, the processor 310 may perform synchronization of stored files or folders based on a preconfigured synchronization method. For example, it will be assumed that the synchronization method is configured as a method for performing synchronization using the latest files among the files stored in the external device and the files stored in the electronic device 210. If the files stored in the external device are the latest files, the processor 310 may update the files stored in the storage 320 with the files stored in the external device. The processor 310 according to an embodiment may display the synchronization UI 421 in the case where files stored in the electronic device 210 and the corresponding files stored in the external device are not identical to each other.

Referring to FIG. 4, it can be seen that only the external device 1 411 is currently connected to the electronic device 210, and the external devices 2 to 9 are not connected to the electronic device 210. The file-and-folder list screen 400 displays the list of files and folders corresponding to external device 1 411.

The processor 310 according to an embodiment may receive a user input for selecting some files or folders included in the list of files and folders. Referring to file 1 425 and file 2 426 displayed in area 420, it may be identified that file 1 425 is selected and file 2 426 is not selected. Thereafter, if the processor 310 receives a user input for selecting the storage UI 428 for storing the selected file or folder, the processor 310 may store only the selected file 1 425 in the storage 230. File 1 425 stored in the storage 230 may be executed in and used by the electronic device 210 even if the external device 1 411 is disconnected.

Figure 5:
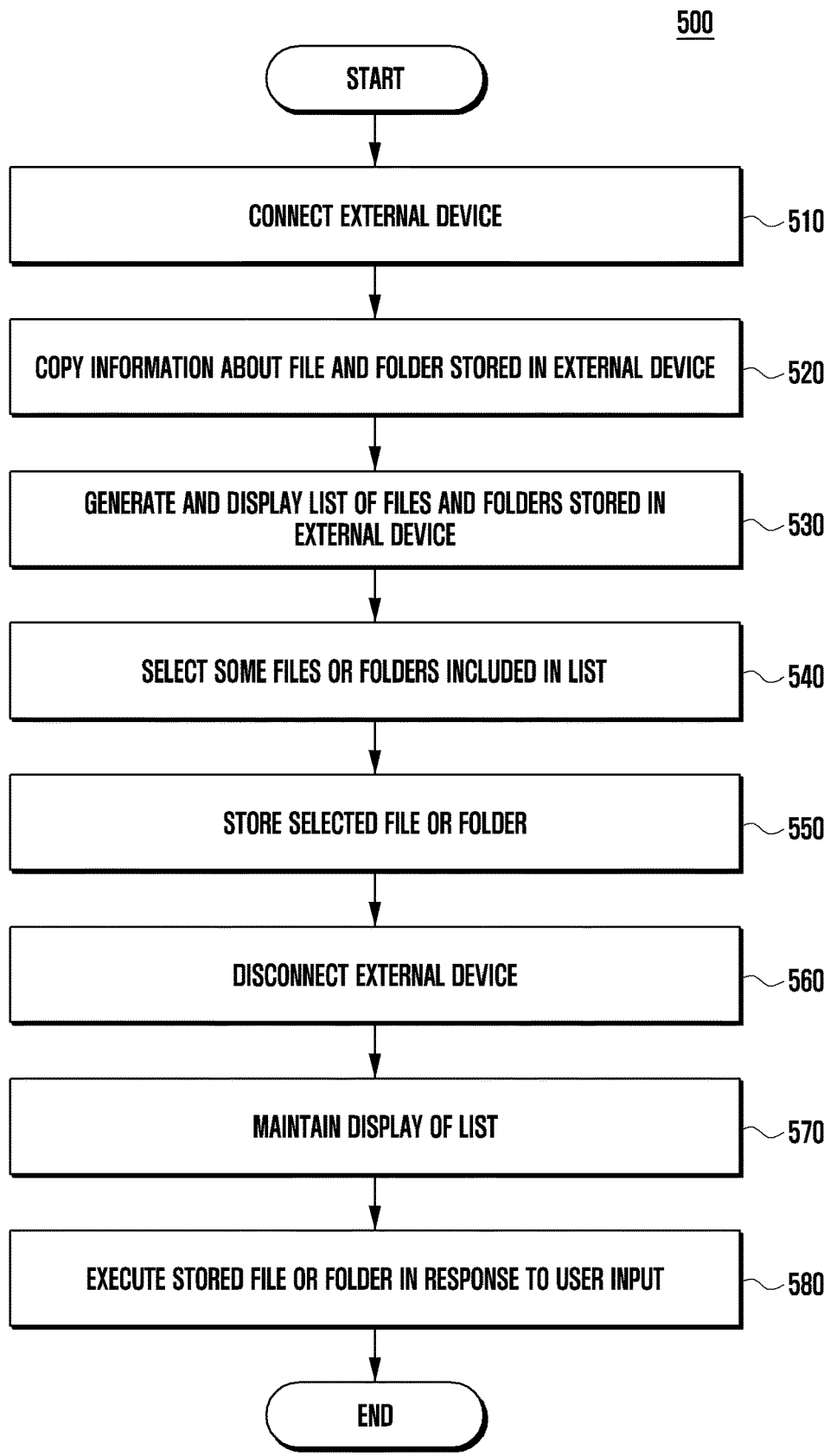
FIG. 5 is a flowchart illustrating an operation of an electronic device according to an embodiment.

FIG. 5 is a flowchart 500 illustrating an operation of an electronic device according to an embodiment.

Referring to the operation flowchart 500, the processor 310 according to an embodiment may detect that an external device is connected through the connecting terminal 340, in operation 510. The processor 310 may, for example, identify a connected external device. For example, the processor 310 may establish a communication link between the external device and the electronic device 210 based on the connection of the external device through the connecting terminal 340. In one example, the communication link may allow for wired and/or wireless communication.

In operation 520, the processor 310 according to an embodiment may copy information about files and folders stored in the external device. For example, the processor 310 may entirely copy (block copy) a storage area containing information about files and folders stored in the external device, where the area is one of a plurality of areas implementing the file system of the external device. In more specific examples, if the file system of the external device is NTFS, the processor may copy the MFT area, and if the file system of the external device is FAT32, the processor may copy the FAT area. Information about files and folders may include, for example, file names, folder names, tree structures of folders, storage locations, generation times, recent modification times, recent access times, various file attributes, file sizes and/or information on clusters.

In operation 530, the processor 310 according to an embodiment may generate a list of files and folders stored in the external device, based on the copied information. For example, the processor 310 may display the generated list of files and folders through the display 330 and store the generated list files and folders in the storage 320.

In operation 540, the processor 310 according to an embodiment may receive a user input for selecting some of the files or folders included in the list of files and folders.

In operation 550, the processor 310 according to an embodiment may store the selected files or folders in the storage 320. For example, the processor 310 may copy the selected files or folders from the external device and store the copied files or folders in the storage 320.

In operation 560, the processor 310 according to an embodiment may detect disconnection of the external device.

In operation 570, the processor 310 according to an embodiment may maintain displaying of the list of files and folders through the display 330 even after the external device is disconnected. According to an embodiment, even if the external device is disconnected, the list of files and folders corresponding to the external device may be displayed by the electronic device 210, and information about the files and folders included in the list of files and folders may be identified. For example, the processor 310 may disconnect the communication link between the electronic device 210 and the external device when the external device is disconnected.

In operation 580, the processor 310 according to an embodiment may execute the files or folders stored in the storage 320 even after the external device is disconnected. For example, if the processor 310 receives a user input for executing the files or folders stored in the storage 320 even after the external device is disconnected, the processor 310 may execute or use or otherwise manipulate the files or folders stored in the storage 320 in response to the user input. According to an embodiment, the user input for executing the files or folders stored in the storage 320 may be input on a user interface displaying the list of files and folders.

Figure 6:
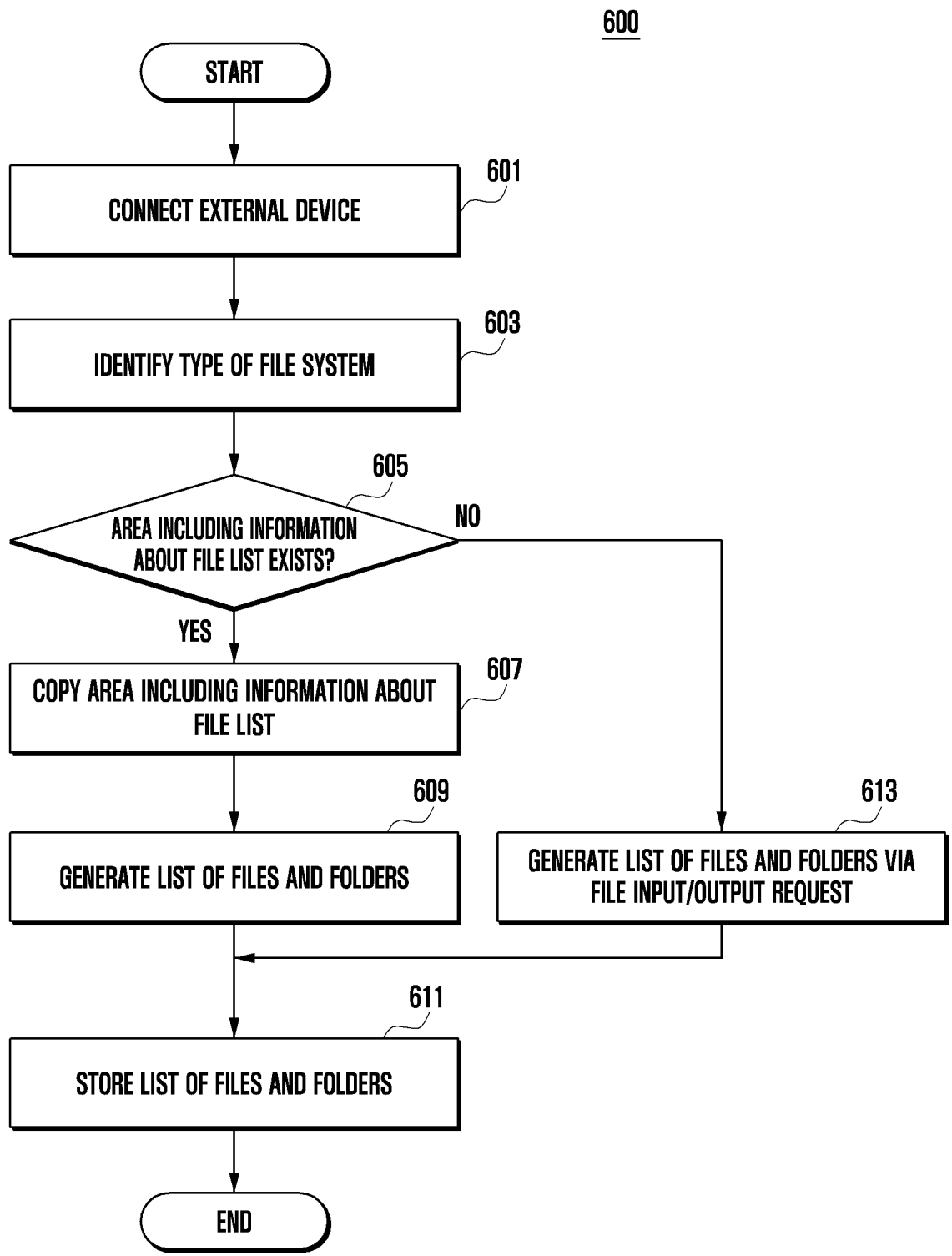
FIG. 6 is a flowchart illustrating an operation of an electronic device according to an embodiment.

FIG. 6 is a flowchart 600 illustrating an operation of an electronic device according to an embodiment.

Referring to the operation flowchart 600, the processor 310 according to an embodiment may detect that an external device is connected through the connecting terminal 340, in operation 601. For example, the processor 310 may establish a communication link between the external device and the electronic device 210 based on the connection with the external device.

In operation 603, the processor 310 according to an embodiment may identify the type of the file system of the connected external device. The type of the file system may include, for example, NTFS, FAT32, FAT16, ext2, and ReiserFS.

In operation 605, the processor 310 according to an embodiment may determine whether an area including information about a file list exists, based on the identified type of file system. The information about the file list is, for example, information required for generating the list of files and folders stored in the external device, and may include information about all the files and folders existing on a volume. For example, if the file system of the external device is NTFS, since the MFT area, which is an area including the information about the file list, exists, the processor 310 may determine that the result of operation 605 is YES. In another example, if the file system of the external device is FAT32, since the FAT area, which is an area including the information about the file list, exists, the processor 310 may determine that the result of operation 605 is YES. If the external device is a device having its own operating system (for example, if the external device is a portable terminal running the Android operating system), the processor 310 may determine that there is no area including information about the file list.

If it is determined that there is an area including information about the file list, the process branches to operation 607 and the processor 310 may copy the area including the information about the file list. The processor 310 may, for example, block copy the entirety of the area including the information about the file list.

The process branches to operation 609 and the processor 310 according to an embodiment may generate a list of files and folders based on the copied area including information about the file list. The list of files and folders may be, for example, a list corresponding to the files and folders stored in the external device. If the processor generates the list of files and folders by block copying the entirety of the area including information about the file list, the generated list of files and folders may be identical to the file structure of the external device.

If it is determined in operation 605 that there is no area including the information about the file list, the process branches to operation 613, and the processor 310 according to an embodiment may generate a list of files and folders by performing input/output requests with respect to the files and folders stored in the external device.

In operation 611, the processor 310 according to an embodiment may store the generated list of files and folders in the storage.

Figure 7:
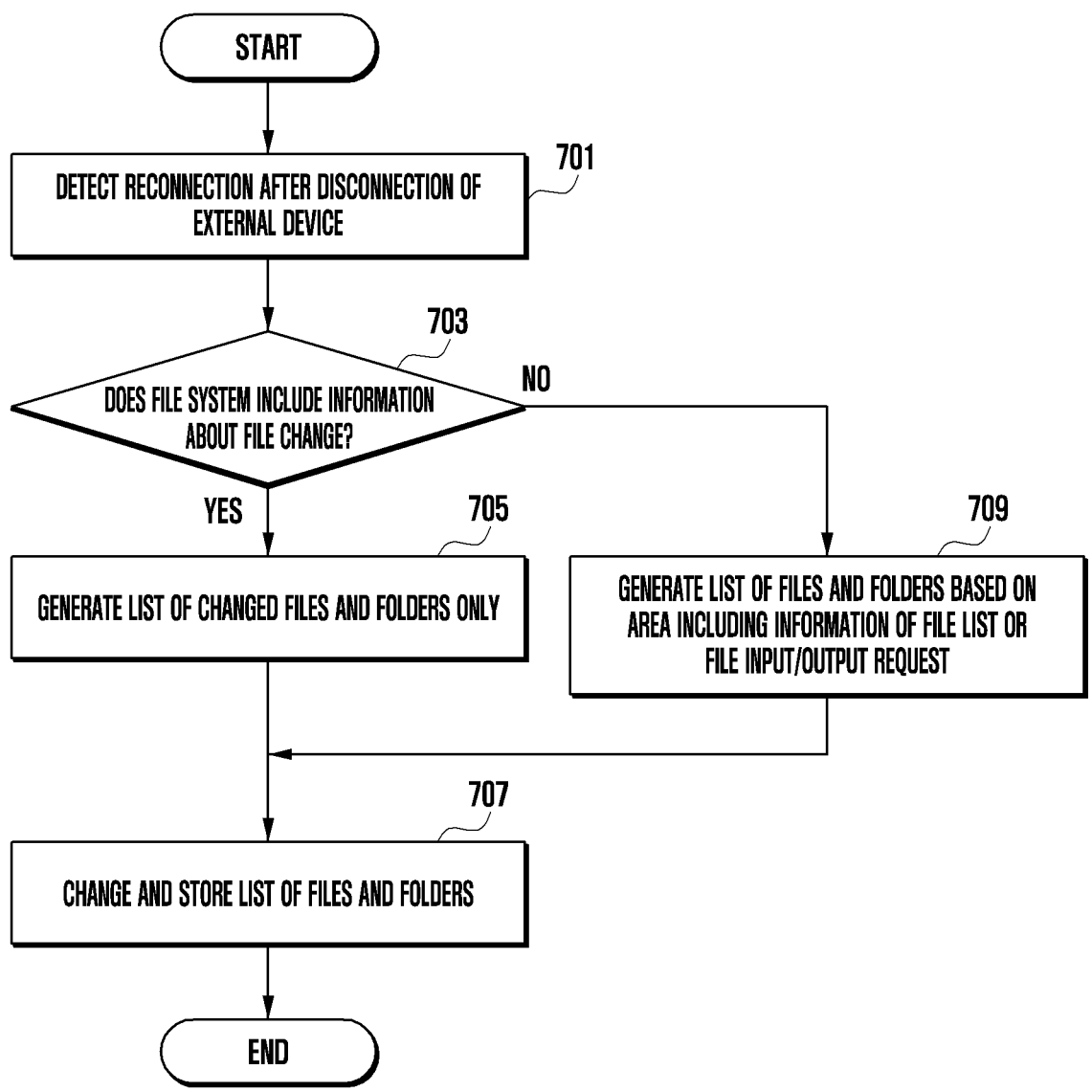
FIG. 7 is a flowchart illustrating an operation of an electronic device according to an embodiment.

FIG. 7 is a flowchart 700 illustrating an operation of an electronic device according to an embodiment.

Referring to the operation flowchart 700, the processor 310 according to an embodiment may detect that an external device has been reconnected to the electronic device 210 after the external device was previously disconnected, in operation 701.

In operation 703, the processor 310 according to an embodiment may determine whether the file system of the external device is a file system that includes information about file changes. For example, if the file system of the external device is NTFS, the file system of the external device may record, in the USN journal, all changes to a volume since last backup was made. The USN journal is, for example, a block included in NTFS. If the file system of the reconnected external device is NTFS, the processor 310 may determine that the file system includes information about file changes.

If it is determined that the file system of the external device is a file system including information on file changes, the process branches to operation 705 and the processor 310 may use the information on the file changes to generate a list of changed files and folders. For example, if the file system of the external device is NTFS, the processor may fetch information about files and folders that have been changed after the last saved time point, using information recorded in the USN journal, and may generate a list of changed files and folders using the fetched information.

In operation 707, the processor 310 according to an embodiment may change the file and the list stored in the storage 320 to the latest state, based on the list of the changed files and folders.

In operation 703, if it is determined that the file system of the external device is not a file system including information about file changes, the process branches to operation 709 and the processor 310 may newly generate a list of files and folders based on the area including information about the file list or file input/output requests. Operation 709 may be performed by performing some of the operations shown in FIG. 6 and for simplicity descriptions thereof are not repeated here. The process branches to operation 707, and the processor 310 may change the list of files and folders stored in the storage 320 to the latest state based on the generated list of files and folders.

Figure 8:
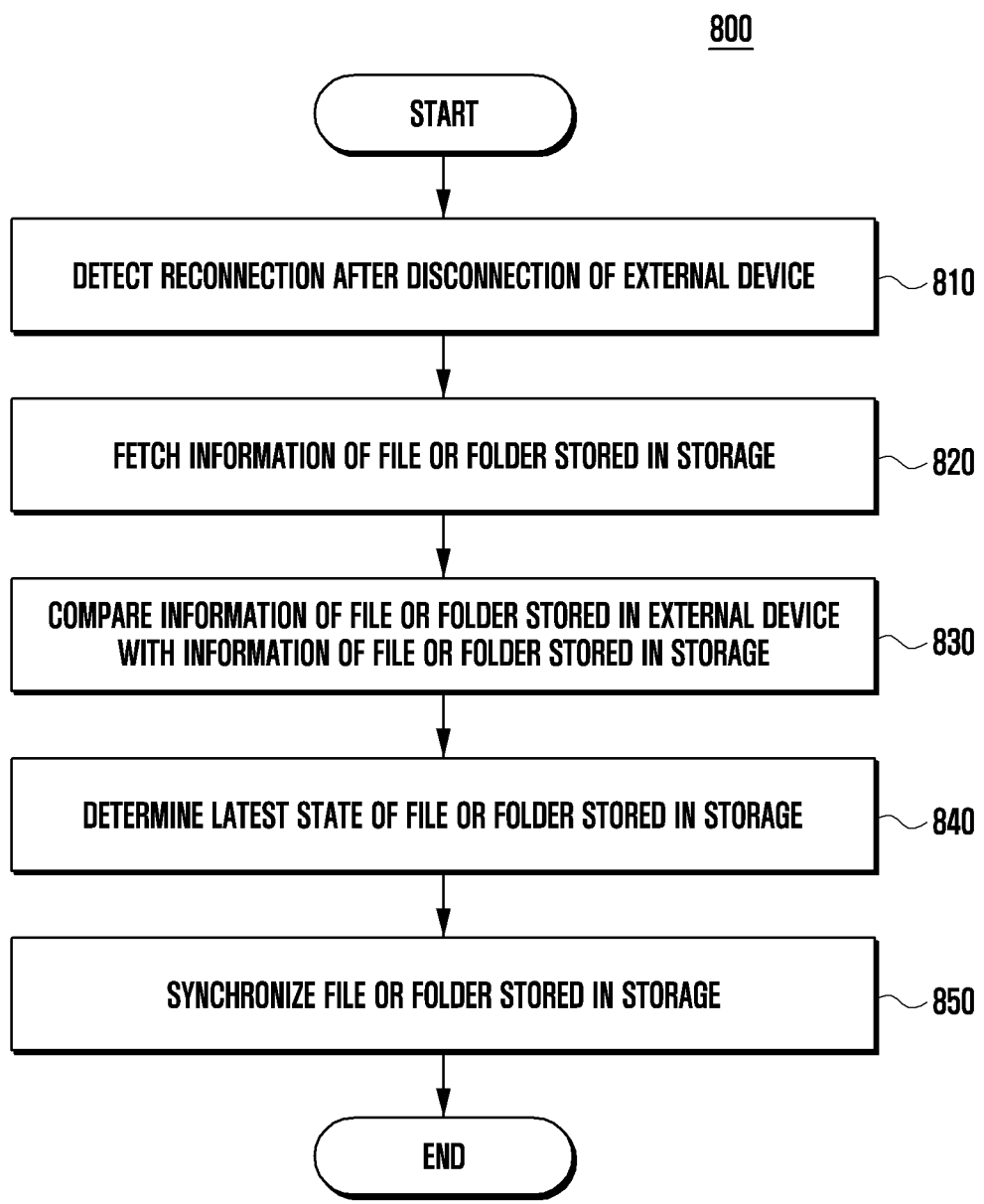
FIG. 8 is a flowchart illustrating an operation of an electronic device according to an embodiment.

FIG. 8 is a flowchart 800 illustrating an operation of an electronic device according to an embodiment.

FIG. 8 is an operation flowchart illustrating a method for synchronizing some of the files or folders stored in the storage 320 of the electronic device 210 with the corresponding files or folders stored in an external device if the external device is disconnected and then reconnected to the electronic device 210.

Referring to operation 800, the processor 310 according to an embodiment may detect that the external device is reconnected to the electronic device 210 after the connection of the external device was previously released, in operation 810.

In operation 820, the processor 310 according to an embodiment may fetch information about files or folders stored in the storage 320. If the external device has been connected previously, certain files or folders may be selected to be stored in the storage 320, and copied from the connected electronic device and stored in the storage 320. The files or folders stored in the storage 320 refer to those files and folders. The files or folders stored in the storage 320 may be stored in the storage 320 even if the external device is subsequently disconnected.

In operation 830, the processor 310 according to an embodiment may compare information about the files and folders currently stored in the external device with information about the files or folders stored in the storage 320. The processor 310 may determine, for example, if a list of files and folders currently stored in the external device includes files or folders corresponding to the files or folders stored in the storage 320. The processor 310 may compare, for example, information about the recent modification times of files or folders stored in the storage 320 and information about the recent modification times of files or folders corresponding to the selected files or folders, among the files and folders currently stored in the external device.

In operation 840, if the list of files and folders currently stored in the external device includes files or folders corresponding to files or folders stored in the storage 320, the processor 310 according to an embodiment may compare the files or folders stored in the storage with the corresponding files or folders currently stored in the external device, and determine which one is the latest. For example, if the files or folders stored in the storage 320 do not exist in the list of files and folders currently stored in the external device, the processor 310 may determine that the files or folders stored in the storage 320 are stored only in the electronic device 210.

In operation 850, the processor 310 according to an embodiment may synchronize the files or folders stored in the storage 320, based on information about the latest state of the files or folders stored in the storage 320 and a preconfigured synchronization method. For example, if the file stored in the storage 320 is the latest file, and the preconfigured synchronization method is a method of performing synchronization with the latest files stored in the external device and the storage 320 of the electronic device 210, the processor 310 may change the file stored in the external device to be the same as the file stored in the storage 320 without changing the file stored in the storage 320. In another example, if the file stored in the storage 320 is the latest file and the preconfigured synchronization method is a method of performing synchronization always with the file stored in the external device, the processor 310 may change the file stored in the storage 320 to be the file stored in the external device. The synchronization method may be configured by the user through the configuration UI 433 of FIG. 4.

Figure 9:
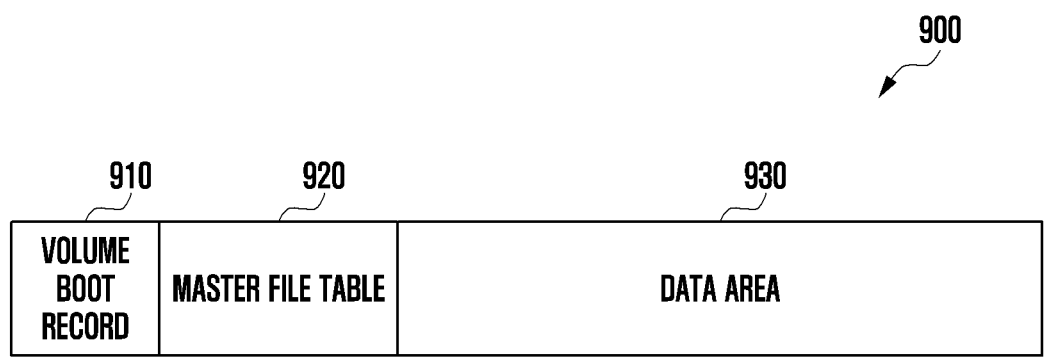
FIG. 9 illustrates a structure of a file system of an external device according to an embodiment.

FIG. 9 is a diagram illustrating a structure of a file system of an external device according to an embodiment.

FIG. 9 is a block diagram showing a structure 900 of NTFS. Referring to FIG. 9, the NTFS may include a volume boot record (VBR) area 910, a master file table (MFT) area 920, and a data area 930.

According to an embodiment, the VBR area 910 may be an area in which various configuration values of the file system are stored.

According to an embodiment, the MFT area 920 may be a table area including information about all files and directories existing in the volume. The MFT area 920 may include, for example, a plurality of MFT entries, and a file or directory may have at least one MFT entry. The MFT area 920 may include, for example, attribute information (e.g., file names, folder names, tree structures of folders, storage locations, generation times, recent modification times, recent access times, various file attributes, file sizes and/or information on clusters) of each file or each folder. The size of the MFT area 920 is variable.

The data area 930 according to an embodiment may be an area in which file data is stored.

According to an embodiment, the MFT 920 may include a plurality of MFT entries, and may store metadata of files stored in the data area 930.

Entry numbers 0 to 15 in MFT entries are reserved and serve as metadata files of the file system. $MFT, which is entry number 0 in the MFT entries, is an MFT entry for the MFT area 920 and may store size, location, and allocation information of the MFT area. $MFTMirr, which is entry number 1 in the MFT entries, may be a backup file of the MFT. For example, $MFTMirr may copy and store the first four entries in $MFT. $LogFile, which is entry number 2 in the MFT entries, may store transaction journal records. For example, $LogFile may record all pieces of information, which affects MFT entries, including generation of new files, a content change, and a file name change. $Volume, which is entry number 3 in the MFT entries, may store the volume label and version. In addition, $UsnJrnl in the MFT entries may be a file in which the change history of files and directories is recorded. The MFT area may include an MFT entry for a general file in which a directory or a file added by a user is stored.

With regard to the structure of an MFT entry corresponding to a general file, a file record according to an embodiment may include an entry header, a standard information area, a file name area ($file name), a data area ($data), and an unused area. The entry header may store, for example, basic information of the MFT entry. The standard information area may include, for example, general information about a latest generation time, an access time, a modification time, and an owner of a file. The standard information area may include USN information, for example. The file name area may include information about a file name and a folder name, for example. The data area may include, for example, information about a file content (e.g., a file size).

According to an embodiment, if the file system of an external device connected through the connecting terminal 340 is NTFS, the processor 310 may copy the entirety of the MFT area 920 to generate a list of files and folders corresponding to the external device.

According to an embodiment, the file system of the external device may be FAT32 (not shown).

According to an embodiment, the FAT32 may include: a data area including a boot record area, a reserved area, and a FAT area (or FAT #1 and FAT #2), a root directory area, and an unused area.

Among the plurality of areas of the FAT32, the FAT area may be, for example, an area including information for all the files and clusters stored in the corresponding hard disk. For example, whether or not files and directories are allocated may be recorded in the FAT area, and may be recorded in units of clusters. The FAT area may include, for example, a FAT #1 area and a FAT #2 area, where FAT #2 serves as a backup for FAT #1. In this case, FAT #2 may be referred to as a FAT mirror, for example.

According to an embodiment, if the file system of an external device connected through the connecting terminal 340 is FAT32, the processor 310 may copy the entirety of the FAT area (FAT #1 and FAT #2) to generate a list of files and folders corresponding to the external device.

An electronic device 210 according to an embodiment disclosed herein may include a display 330, an input device 350, a connecting terminal 340, a storage 320, and a processor 310 operatively connected to the display 330, the input device 350, the connecting terminal 340, and the storage 320, wherein the processor 310 may be configured to: copy information about files and folders stored in an external device (e.g., external devices 221, 222, 223, 224, 225, 226, and 227 of FIG. 2) when the external device is connected to the electronic device 210; based on the copied information, generate a list of the files and the folders stored in the external device and display the generated list of the files and the folders through the display 330; receive a first user input for selecting some of the files or folders included in the list of the files and the folders; in response to the reception of the first user input, copy the selected file or folder from the external device and store the copied file and folder in the storage 320; maintain displaying of the list of the files and the folders even after the external device is disconnected; and execute the file or the folder stored in the storage 320 in response to a second user input for executing the file or the folder stored in the storage 320.

In an electronic device 210 according to an embodiment disclosed herein, the processor 310 may be configured to copy an area including the information about the files and the folders stored in the external device among a plurality of areas implementing a file system of the external device.

In an electronic device 210 according to an embodiment disclosed herein, the processor 310 may be configured to copy an MFT area if a file system of the external device is NTFS, and to copy an FAT area if the file system of the external device is FAT32.

In an electronic device 210 according to an embodiment disclosed herein, the information about the files and folders includes file names, folder names, tree structures of folders, storage locations, generation times, recent modification times, recent access times, file attributes, file sizes, and/or information on clusters.

In an electronic device 210 according to an embodiment disclosed herein, the processor 310 may be configured to further display whether the external device is currently connected and whether the files and the folders included in the list are stored therein.

In an electronic device 210 according to an embodiment disclosed herein, the processor 310 may be configured to further display a search are for searching information included in the list of the files and the folders even after the external device is disconnected.

In an electronic device 210 according to an embodiment disclosed herein, when the file selected based on the first input is an image file or a video file, the processor 310 may be configured to store a thumbnail of the selected image file or video file in the storage 320.

In an electronic device 210 according to an embodiment disclosed herein, the processor 310 may be configured to: when the external device is disconnected and then is connected again to the electronic device 210, compare information about the file or the folder stored in the storage 230 with information about a corresponding file or a corresponding folder currently stored in the external device; determine information about the latest state of the file or the folder stored in the storage 320 based on a result of the comparison; and synchronize the file or the folder stored in the storage 320, based on the determined information about the latest state and a preconfigured synchronization method.

In an electronic device 210 according to an embodiment disclosed herein, the processor 310 may be configured to further display information about the latest state of the file or the folder stored in the storage 320.

In an electronic device 210 according to an embodiment disclosed herein, the processor 310 may be configured to:

when the external device is disconnected and then connected again to the electronic device 210, identify whether a file system of the external device is a file system that includes information about a file change; and when the file system of the external device is a file system that includes the information about the file change, change the list of the files and the folders based on the information about the file change included in the file system of the external device.

An operation method of the electronic device 210 according to an embodiment disclosed herein may include: copying information about files and folders stored in an external device (e.g., external devices 221, 222, 223, 224, 225, 226, and 227 of FIG. 2) when the external device is connected to the electronic device 210; generating a list of the files and the folders stored in the external device, based on the copied information, and displaying the generated list of the files and the folders through the display 330; receiving a first user input for selecting some of the files or folders included in the list of the files and the folders; in response to the reception of the first user input, copying the selected file or folder from the external device and storing the copied file and folder in the storage 320; maintaining the display of the list of the files and the folders even after the external device is disconnected; and executing the file or folder stored in the storage 320 in response to a second user input for executing the file or the folder stored in the storage 320.

In an operation method of the electronic device 210 according to an embodiment disclosed herein, the copying of the information about the files and the folders stored in the external device may include copying an area including the information about the files and the folders stored in the external device among a plurality of areas implementing a file system of the external device.

In an operation method of the electronic device 210 according to an embodiment disclosed herein, the copying of the area may include copying an MFT area if a file system of the external device is NTFS, and copying an FAT area if the file system of the external device is FAT32.

In an operation method of the electronic device 210 according to an embodiment disclosed herein, the information about the file and folder includes file names, folder names, tree structures of folders, storage locations, generation times, recent modification times, recent access times, file attributes, file sizes, and/or information on clusters.

An operation method of the electronic device 210 according to an embodiment disclosed herein may further include displaying whether the external device is currently connected and whether the respective files and folders included in the list are stored.

An operation method of the electronic device 210 according to an embodiment disclosed herein may further include displaying a search area for searching information included in the list of the files and the folders even after the external device is disconnected.

In an operation method of the electronic device 210 according to an embodiment disclosed herein, when the file selected based on the first input is an image file or a video file, the operation method may further comprise storing a thumbnail of the selected image file or video file in the storage 320.

An operation method of the electronic device 210 according to an embodiment disclosed herein may further include: when the external device is disconnected and then is connected again to the electronic device 210, comparing information about the file or the folder stored in the storage 230 with information about a corresponding file or a corresponding folder currently stored in the external device; determining information about the latest state of the file or the folder stored in the storage 320, based on a result of the comparison; and synchronizing the file or the folder stored in the storage 320, based on the determined information about the latest state and a preconfigured synchronization method.

An operation method of the electronic device 210 according to an embodiment disclosed herein may further include, after the determining of information about the latest state of the file or the folder stored in the storage 320, displaying the information about the latest state of the file or the folder stored in the storage 320 through the display 330.

An operation method of the electronic device 210 according to an embodiment disclosed herein may further include: when the external device is disconnected and then connected again to the electronic device 210, identifying whether a file system of the external device is a file system that includes information about a file change; and when the file system of the external device is a file system that includes the information about the file change, changing the list of the files and the folders based on the information about the file change included in the file system of the external device.

An electronic device according to an embodiment may display information about files and folders stored in a plurality of external devices even when connections with the plurality of external devices are released.

An electronic device according to an embodiment may copy information (for example, file name, storage location, and folder tree structure) of files and folders stored in a plurality of external devices to a storage of the electronic device and generate a list of files and folders, so as to be able to display information about the files and folders stored in the external device while using less storage capacity of the electronic device as compared to the case where the electronic device stores copies of the files and folders of the plurality of external devices.

An electronic device according to an embodiment may easily identify a storage location in which a specific file is stored, by collectively searching for files stored in a plurality of external devices, without requiring the user to separately search the plurality of external devices individually.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a display;
an input device;
a connecting terminal;
a storage; and
a processor operatively connected to the display, the input device, the connecting terminal, and the storage,
wherein the processor is configured to:
copy information about files and folders stored in an external device, when the external device is connected through the connection terminal;
generate a list of the files and the folders stored in the external device, based on the copied information, and display the generated list of the files and the folders through the display;
receive, through the input device, a first input associated with the list of the files and the folders;
copy a file and/or a folder, selected based on the first input, from the external device, and store the copied file and/or folder in the storage;
maintain displaying of the list of the files and the folders stored in the external device when the external device is disconnected; and
execute the file or the folder stored in the storage, based on a second input received through the input device.

2. The electronic device of claim 1, wherein the processor is further configured to copy at least one area including the information about the files and the folders stored in the external device among a plurality of areas implementing a file system of the external device.

3. The electronic device of claim 2, wherein the at least one area includes a master file table (MFT) area if the file system of the external device is new technology file system (NTFS), and includes a file allocation table (FAT) area if the file system of the external device is file allocation table 32 (FAT32).

4. The electronic device of claim 1, wherein the information about the files and the folders includes file names, folder names, tree structures of folders, storage locations, generation times, recent modification times, recent access times, file attributes, file sizes, and/or information on clusters.

5. The electronic device of claim 1, wherein the processor is further configured to display, through the display, whether the external device is currently connected and whether the files and the folders included in the list have been stored in the storage.

6. The electronic device of claim 1, wherein the processor is further configured to display, through the display, a search area for searching information included in the list of the files and the folders.

7. The electronic device of claim 1, wherein, when the file selected based on the first input is an image file or a video file, the processor is further configured to store, in the storage, a thumbnail of the image file or the video file.

8. The electronic device of claim 1, wherein the processor is further configured to:
when the external device is disconnected and then is connected again to the electronic device, compare information about the file or the folder stored in the storage with information about a corresponding file or a corresponding folder currently stored in the external device;
determine update information of the file or the folder stored in the storage based on a result of the comparison; and
synchronize the file or the folder stored in the storage with the corresponding file or the corresponding folder stored in the external device, based on the update information.

9. The electronic device of claim 8, wherein the processor is further configured to further display, through the display, the update information of the file or the folder stored in the storage.

10. The electronic device of claim 1, wherein the processor is further configured to:
when the external device is disconnected and then connected again to the electronic device, identify whether a file system of the external device is a file system that includes information about a file change; and
when the file system of the external device is the file system that includes the information about the file change, change the list of the files and the folders based on the information about the file change included in the file system of the external device.

11. An operation method of an electronic device, the operation method comprising:
copying information about files and folders stored in an external device when the external device is connected to the electronic device;
generating a list of the files and the folders stored in the external device, based on the copied information, and displaying the generated list of the files and the folders through a display of the electronic device;
receiving a first input associated with the list of the files and the folders;
copying a file and/or a folder, selected based on the first input, from the external device, and storing the copied file and/or folder in a storage of the electronic device; and executing the file or the folder stored in the storage based on a second input when the external device is disconnected,
wherein the displaying of the list of the files and the folders stored in the external device is maintained when the external device is disconnected.

12. The operation method of claim 11, wherein the copying of the information about the files and the folders comprises copying at least one area including the information about the files and the folders stored in the external device among a plurality of areas implementing a file system of the external device.

13. The operation method of claim 12, wherein the at least one area includes a master file table (MFT) area if the file system of the external device is new technology file system (NTFS), and includes a file allocation table (FAT) area if the file system of the external device is file allocation table 32 (FAT32).

14. The operation method of claim 11, wherein the information about the files and folders includes file names, folder names, tree structures of folders, storage locations, generation times, recent modification times, recent access times, file attributes, file sizes, and/or information on clusters.

15. The operation method of claim 11, further comprising displaying whether the external device is currently connected and whether the files and the folders included in the list have been stored in the storage.

16. The operation method of claim 11, further comprising displaying a search area for searching information included in the list of the files and the folders.

17. The operation method of claim 11, wherein, when the file selected based on the first input is an image file or a video file, the operation method further comprises storing, in the storage, a thumbnail of the image file or the video file.

18. The operation method of claim 11, further comprising:
when the external device is disconnected and then is connected again to the electronic device, comparing information about the file or folder stored in the storage with information about a corresponding file or a corresponding folder currently stored in the external device;
determining update information of the file or the folder stored in the storage, based on a result of the comparison; and
synchronizing the file or the folder stored in the storage with the corresponding file or the corresponding folder stored in the external device, based on the update information.

19. The operation method of claim 18, further comprising displaying, through the display, the update information of the file or the folder stored in the storage.

20. The operation method of claim 11, further comprising:
when the external device is disconnected and then is connected again to the electronic device, identifying whether a file system of the external device is a file system that includes information about a file change; and
when the file system of the external device is the file system that includes the information about the file change, changing the list of the files and the folders based on the information about the file change included in the file system of the external device.

* * * * *